(12) United States Patent
Ito et al.

(10) Patent No.: US 10,156,271 B2
(45) Date of Patent: Dec. 18, 2018

(54) HYDRAULIC STRUCTURE FOR CLUTCH DEVICE

(71) Applicant: AISIN AW CO., LTD., Anjo-shi, Aichi-ken (JP)

(72) Inventors: Kazuyoshi Ito, Tsushima (JP); Keizo Araki, Hekinan (JP); Akiyoshi Otsuki, Anjo (JP); Junya Kashimura, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 91 days.

(21) Appl. No.: 15/116,069

(22) PCT Filed: Feb. 20, 2015

(86) PCT No.: PCT/JP2015/054729
§ 371 (c)(1),
(2) Date: Aug. 2, 2016

(87) PCT Pub. No.: WO2015/151637
PCT Pub. Date: Oct. 8, 2015

(65) Prior Publication Data
US 2017/0138413 A1 May 18, 2017

(30) Foreign Application Priority Data

Mar. 31, 2014 (JP) ................................. 2014-071686

(51) Int. Cl.
*F16D 25/0638* (2006.01)
*F16D 25/12* (2006.01)
*F16H 45/02* (2006.01)

(52) U.S. Cl.
CPC ......... *F16D 25/0638* (2013.01); *F16D 25/12* (2013.01); *F16H 45/02* (2013.01);
(Continued)

(58) Field of Classification Search
CPC .............. F16H 45/02; F16H 2045/021; F16H 2045/0221; F16H 2045/0284; F16D 25/06;
(Continued)

(56) References Cited

U.S. PATENT DOCUMENTS 6,293,380 B1 * 9/2001 Arhab ..................... F16H 45/02
192/3.29
2001/0032766 A1 * 10/2001 Yoshimoto ............... B62M 7/02
192/3.25
(Continued)

FOREIGN PATENT DOCUMENTS

DE 601 00 991 T2 9/2004
JP 2002-213568 A 7/2002
(Continued)

OTHER PUBLICATIONS

Isao, Hirota et al. Machine Translation of JP2003120720A Motive Power Transmission Device and Its Installation Method. Apr. 23. 2005. Espacenet.*
(Continued)

*Primary Examiner* — Richard M Lorence
*Assistant Examiner* — Lori Wu
(74) *Attorney, Agent, or Firm* — Sughrue Mion, PLLC

(57) ABSTRACT

A center piece is coupled to a flange member to thereby form a second oil path between an intermediate wall portion of the center piece and the flange portion. A male screw portion is formed on an outer peripheral surface of a cylindrical portion of the center piece, and a nut member in which a female screw portion is formed on an inner peripheral surface is screwed to the male screw portion. Accordingly, the flange member is pressed onto the intermediate wall portion to thereby couple the center piece to the flange
(Continued)

member. As a result, the center piece can be coupled to the flange member without causing backlash.

21 Claims, 4 Drawing Sheets

(52) U.S. Cl.
CPC ...... *F16D 2300/08* (2013.01); *F16D 2300/12* (2013.01); *F16H 2045/021* (2013.01); *F16H 2045/0226* (2013.01); *F16H 2045/0284* (2013.01)

(58) Field of Classification Search
CPC .. F16D 25/062; F16D 25/063; F16D 25/0638; F16D 25/12
See application file for complete search history.

(56) References Cited

U.S. PATENT DOCUMENTS

| | | | |
|---|---|---|---|
| 2002/0034998 A1 | 3/2002 | Tsunemi et al. | |
| 2003/0087720 A1 | 5/2003 | Lepelletier | |
| 2004/0168878 A1 | 9/2004 | Yabe et al. | |
| 2004/0188208 A1* | 9/2004 | Leber | F16H 45/02 192/3.25 |
| 2009/0035129 A1* | 2/2009 | Samie | F16H 41/30 415/191 |
| 2012/0152681 A1* | 6/2012 | Avins | F16H 45/02 192/3.29 |
| 2013/0256075 A1* | 10/2013 | Walker | F16H 41/24 192/3.29 |
| 2014/0027231 A1 | 1/2014 | Tanaka et al. | |

FOREIGN PATENT DOCUMENTS

| | | |
|---|---|---|
| JP | 2003-120720 A | 4/2003 |
| JP | 2004-239404 A | 8/2004 |
| JP | 2008-82345 A | 4/2008 |
| JP | 2012-215222 A | 11/2012 |
| WO | 2012/132740 A1 | 10/2012 |

OTHER PUBLICATIONS

Araki, Keizo et al. Machine Translation of JP2012215222A Clutch Device and Hydraulic Power Transmission Including the Same. Nov. 8, 2012. Espacenet.*

"Caulk." Merriam-Webster.com. Merriam-Webster, n. d. Web. Jan. 22, 2018.*

International Search Report for PCT/JP2015/054729 dated May 12, 2015.

* cited by examiner

HYDRAULIC STRUCTURE FOR CLUTCH DEVICE

CROSS REFERENCE TO RELATED APPLICATIONS

This application is a National Stage of International Application No. PCT/JP2015/054729 filed Feb. 20, 2015, claiming priority based on Japanese Patent Application No. 2014-071686 filed Mar. 31, 2014, the contents of all of which are incorporated herein by reference in their entirety.

TECHNICAL FIELD

The present disclosure relates to a clutch device including a clutch section capable of being engaged or released by output or non-output of hydraulic pressure to an oil chamber.

BACKGROUND ART

In recent years, a torque converter (hydraulic power transmission device) provided between an engine and an automatic transmission mounted on a vehicle is provided with a lockup clutch which performs lockup of the torque converter for eliminating slip loss of the torque converter during running and improving fuel consumption. The lockup clutch moves a piston by supplying oil into a hydraulic oil chamber to thereby engage plural friction plates to perform lockup.

As the above lockup clutch, there is proposed a structure in which an oil passage communicating with a hydraulic oil chamber is formed by coupling a flange member to a center piece of a front cover of the torque converter (Patent Literature 1). In the case of the structure described in Patent Literature 1, the coupling between the center piece and the flange member is performed in the following manner. That is, relative rotation in a circumferential direction is prevented by engaging the center piece with the flange member respectively by claws. Furthermore, the flange member is fit onto a cylindrical portion which is integrally formed with the center piece as well as fixed by a snap ring to thereby regulate positions of the center piece and the flange member in an axial direction.

CITATION LIST

Patent Literature

Patent Literature 1: WO2012/132740

SUMMARY

Technical Problem

However, when the center piece (a first member) is coupled to the flange member (a second member) by claws or the snap ring as described above, backlash may occur in the circumference direction and the axial direction and abnormal noise may occur. Furthermore, abrasion may occur by the backlash.

In view of the above, there is provided a clutch device capable of coupling the first member to the second member without causing backlash with a simple structure.

Solution to Problem

According to the present disclosure, there is provided a clutch device including a piston pressing friction plates, a first member having a wall portion and a cylindrical portion extending from the wall portion in an axial direction, in which a first screw portion is formed on a peripheral surface, a second member fitted to the cylindrical portion and forming an oil path communicating with an oil chamber allowing an hydraulic pressure to act on the piston between the wall portion and the second member and a screwing member having a second screw portion which can be screwed to the first screw portion freely, which is screwed to the first screw portion and presses the second member toward the wall portion to thereby couple the first member to the second member.

In the clutch device according to the present disclosure, the first member can be coupled to the second member without causing backlash with a simple structure in which the screwing member is screwed to the cylindrical portion of the first member. That is, the screwing member is screwed to the first screw portion and the second member is pressed onto the wall portion to thereby couple the first member to the second member, therefore, the occurrence of backlash can be suppressed.

DESCRIPTION OF EMBODIMENTS

Hereinafter, an embodiment of the present disclosure will be explained with reference to FIG. 1 to FIG. 4. First, structures of an automatic transmission 1 and a torque converter (hydraulic power transmission device) 3 according to the embodiment will be explained with reference to FIG. 1 and FIG. 2.

[Automatic Transmission]

Figure 2:
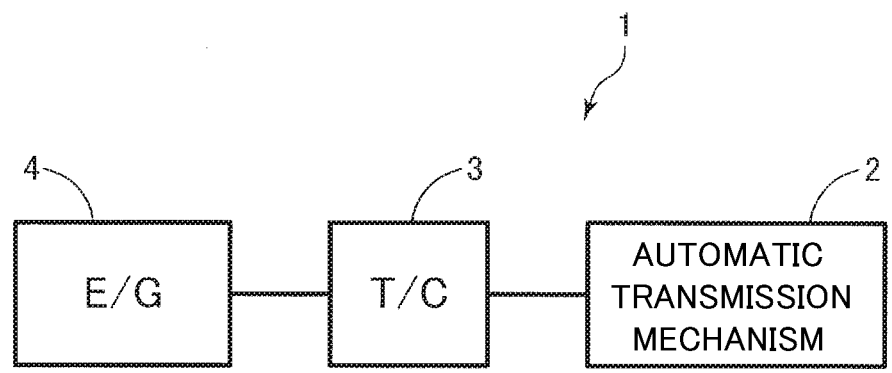
FIG. 2 is a block diagram showing the relation among an engine, the torque converter and an automatic transmission according to the embodiment.

As shown in FIG. 2, the automatic transmission 1 mounted on a vehicle includes an automatic transmission mechanism 2, the torque converter (hydraulic power transmission device) 3 and so on. The automatic transmission mechanism 2 is a multiple transmission mechanism such as 6-speed or 8-speed, or a continuously variable transmission mechanism such as a belt-type CVT or a toroidal CVT, which is drive-coupled with an engine (driving source) 4 through the torque converter 3. A driving force of the engine 4 is transmitted to a not-shown vehicle wheel through the torque converter 3 and the automatic transmission mechanism 2.

[Torque Converter]

Figure 1:
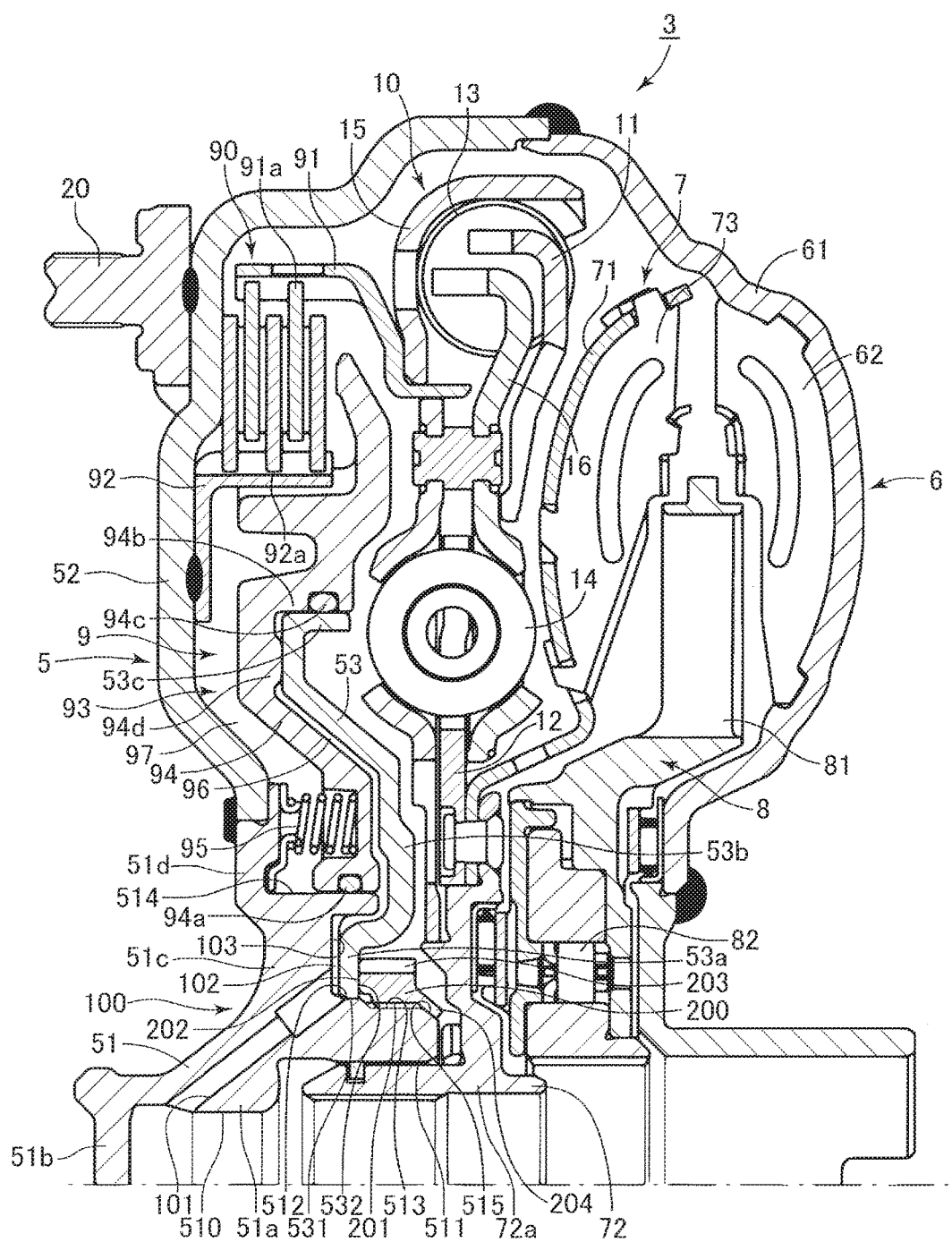
FIG. 1 is a half cross-sectional view of a torque converter according to an embodiment.

The torque converter 3 includes a front cover 5 connected to a crank shaft (output shaft) of the engine 4 (FIG. 2), a pump impeller 6 fixed to the front cover 5, a turbine runner 7 arranged so as to face the pump impeller 6, a stator 8 arranged between the pump impeller 6 and the turbine runner 7, a lockup clutch 9 and a damper device 10 as shown in FIG. 1.

A set block 20 coupled to a not-shown drive plate connected to the crank shaft of the engine 4 is fixed to the front cover 5 by welding. The pump impeller 6 includes a pump shell 61 fixed to the front cover 5 by welding and plural pump blades 62 fixed to the inside of the pump shell 61. The turbine runner 7 includes a turbine shell 71 and plural turbine blades 73 fixed inside the turbine shell 71 so as to face the pump blades 62. The stator 8 includes plural stator blades 81 arranged between the pump blades 62 and the turbine blades 73, and the rotation direction is regulated in one direction through a one-way clutch 82.

When the rotation is transmitted from the engine 4 to the front cover 5 through the crank shaft and the set block 20, the pump impeller 6 rotates. Hydraulic oil is interposed between the pump impeller 6 and the turbine runner 7, and the hydraulic oil acts on the turbine blades 73 of the turbine runner 7 by the rotation of the pump blades 62 of the pump impeller 6, thereby transmitting the rotation to the turbine runner 7. Furthermore, as the hydraulic oil flows from the turbine runner 7 to between the stator blades 81 of the stator 8, the hydraulic oil is rectified and flows into the pump impeller 6. Accordingly, the pump impeller 6, the turbine runner 7 and the stator 8 configure a circulation flow path in which the hydraulic oil is circulated. When the rotations of the pump impeller 6 and the turbine runner 7 are equivalent, the stator 8 supported through the one-way clutch 82 rotates, therefore, it is possible to suppress the stator 8 from preventing circulation of hydraulic oil.

The turbine shell 71 of the turbine runner 7 is fixed to a turbine hub 72 by rivets, and the turbine hub 72 is connected to a not-shown input shaft of the automatic transmission mechanism 2. That is, the input shaft of the automatic transmission mechanism 2 is inserted into the inner diameter side of a cylindrical part 72a of the turbine hub 72, and the cylindrical part 72a and the input shaft are spline-engaged, thereby connecting the turbine hub 72 to the input shaft so as to transmit rotation.

The damper device 10 includes an input member 11 connected to a clutch drum 91 of the later-described lockup clutch 9, an output member 12 fixed to the turbine hub 72 together with the turbine shell 71 by rivets, plural springs 13, 14 arranged between the input member 11 and the output member 12 and a first intermediate member 15 and a second intermediate member 16. The input member 11 is fixed to the clutch drum 91 by, for example, not-shown rivets at plural positions in the circumferential direction, which rotates together with the clutch drum 91.

The spring 13 is arranged between part of the input member 11 in the circumferential direction and part of the first intermediate member 15 in the circumferential direction, and a not-shown spring is arranged between part of the first intermediate member 15 in the circumferential direction which is displaced from the spring 13 and part of the second intermediate member 16 in the circumferential direction. Furthermore, the spring 14 is arranged between part of the second intermediate member 16 in the circumferential direction which is the inner side in the radial direction and the output member 12. Accordingly, the rotation inputted to the input member 11 is transmitted to the output member 12 through the spring 13, the first intermediate member 15, the not-shown spring, the second intermediate member 16 and the spring 14 in this order.

The lockup clutch 9 as the clutch device includes a clutch section 90 and an oil path section 100. The clutch section 90 includes the clutch drum 91 connected to the input member 11 of the damper device 10 as described above, a clutch hub 92 fixed to the front cover 5 by welding, outer friction plates 91a and inner friction plates 92a as plural friction plates and a hydraulic servo 93. The outer friction plates 91a and the inner friction plates 92a are alternately arranged, and the outer friction plates 91a are spline-engaged with the clutch drum 91 and the inner friction plates 92a are spline-engaged with the clutch hub 92.

The hydraulic servo 93 includes a piston 94, a return spring 95, a hydraulic oil chamber 96 and a cancel oil chamber 97. The piston 94 is supported so as to move in the axial direction (right and left direction of FIG. 1) with respect to a hydraulic cylinder including a later-described center piece 51 and a flange member 53 so that a tip end portion is arranged to face the inner friction plates 92a (or the outer friction plates 91a). The return spring 95 is arranged between the center piece 51 and the piston 94, biasing the piston 94 in a direction away from the inner friction plates 92a (or the outer friction plates 91a).

The hydraulic oil chamber 96 is provided between the piston 94 and the flange member 53, allowing a hydraulic pressure (engaging pressure) to act on the piston 94 through the later-described oil path. That is, when the engaging pressure is supplied to the hydraulic pressure chamber 96, the piston 94 moves against the biasing force of the return spring 95 to thereby engage the outer friction plates 91a with the inner friction plates 92a. The cancel oil chamber 97 is provided between the front cover 5 and the piston 94, cancelling a centrifugal hydraulic pressure. Therefore, when the engaging pressure is not supplied to the hydraulic pressure chamber 96, the piston 94 moves by the biasing force of the return spring 95, cancelling the engagement between the outer friction plates 91a and the inner friction plates 92a and releasing the lockup clutch 9.

The oil path section 100 includes a first oil path 101 formed in the center piece 51 as the first member, a second oil path 102 formed between the center piece 51 and the flange member 53 as the second member, and so on. Here, the front cover 5 includes the center piece 51 and a cover body 52 fixed to the center piece 51 by welding. The pump shell 61 is fixed to the cover body 52 by welding and the clutch hub 92 is also fixed to the cover body 52 by welding as described above.

The center piece 51 is configured by including a cylindrical portion 51a formed in an approximately annular shape and extending in the axial direction with a stepped shape in an inner peripheral surface, a wall portion 51b blocking one end part (left end portion in FIG. 1) of the cylindrical portion 51a on the inner diameter side in the axial direction, an intermediate wall portion 51c as a wall portion extending from an intermediate part of the cylindrical portion 51a to the outer side in the radial direction and an outer diameter side wall portion 51d extending from one end portion of the intermediate wall portion 51c in the axial direction to the further outer side in the radial direction. In the embodiment, these respective members are integrally formed as the center piece 51.

An inner peripheral surface of the cylindrical portion 51a has a first inner peripheral surface 510 on one end side (left end side in FIG. 1) in the axial direction and a second inner peripheral surface 511 having a larger inner diameter than that of the first inner peripheral surface 510 on the other end side (right end side in FIG. 1) in the axial direction. The not-shown input shaft of the automatic transmission mechanism 2 is fitted to the first inner peripheral surface 510 so as to rotate freely. Part of the turbine hub 72 in the axial direction is fitted to the second inner peripheral surface 511 so as to rotate freely. A cylindrical surface 512 formed in a cylindrical shape is provided on an outer peripheral surface of the cylindrical portion 51a closer to the other end side than the intermediate wall portion 51c in the axial direction, and a male screw portion 513 having spiral grooves is formed as a first screw portion in a place further closer to other end side than the cylindrical surface 512 in the axial direction (the opposite side of the intermediate wall portion 51c of the cylindrical surface 512).

An inner diameter side sliding surface 514 formed in a cylindrical shape is formed on an outer peripheral surface of the intermediate wall portion 51c closer to the other end side than the outer diameter side wall portion 51d in the axial direction, and the inner peripheral surface of the piston 94 is supported on the inner diameter side sliding surface 514 so as to slide freely. An O-ring (sealing member) 94a is provided between the inner diameter side sliding surface 514 and the inner peripheral surface of the piston 94, thereby sealing between the hydraulic oil chamber 96 and the cancel oil chamber 97. The above-described return spring 95 is arranged between a surface on the other end side of the outer diameter side wall portion 51d in the axial direction and the piston 94.

The flange member 53 as the second member is configured by integrally forming a base end portion 53a on the inner diameter side, a side wall portion 53b extending outward in the radial direction while bending from the base end portion 53a, and an outer diameter side cylindrical portion 53c formed in a cylindrical shape at an outer diameter side end portion of the side wall portion 53b. The base end portion 53a faces the intermediate wall portion 51c, having a fitting surface 531 on an inner peripheral surface, which is freely fitted to the cylindrical surface 512 formed on the outer peripheral surface of the cylindrical portion 51a of the center piece 51 over the entire circumference. A side surface of the base end portion 53a on the opposite side of the intermediate wall portion 51c is formed as an abutted surface 532 formed to be smooth over the entire circumference.

The above-described hydraulic oil chamber 96 is formed between the side wall portion 53b and the piston 94. An intermediate cylindrical portion 94b formed in an intermediate part of the piston 94 in the radial direction is fitted to an outer peripheral surface of the outer diameter side cylindrical portion 53c so that an inner peripheral surface of the intermediate cylindrical portion 94b slides freely. An O-ring (sealing member) 94c is provided between the outer peripheral surface of the outer diameter side cylindrical portion 53c and the inner peripheral surface of the intermediate cylindrical portion 94b to thereby seal between the hydraulic oil chamber 96 and a space on the damper device 10 side of the flange member 53. The hydraulic oil chamber 96 is oil-tightly formed by the above O-ring 94a and the O-ring 94c. A protrusion 94d is formed in part of the side surface of the piston 94 on the flange member 53 side. When the piston 94 moves by being biased by the return spring 95 in a state where the hydraulic pressure is not outputted to the hydraulic oil chamber 96, the movement of the piston 94 is regulated by the protrusion 94d abutting on the flange member 53.

The first oil path 101 is formed so as to penetrate from the inner peripheral surface of the cylindrical portion 51a of the center piece 51 to a surface facing the base end portion 53a of the flange member 53 of the intermediate wall portion 51c. Such first oil path 101 communicates with an oil path formed inside the input shaft of the automatic transmission mechanism 2. The second oil path 102 is formed between the base end portion 53a of the flange member 53 and the intermediate wall portion 51c of the center piece 51. Accordingly, a groove 103 is formed on a surface facing the base end portion 53a of the intermediate wall portion 51c so that the first oil path 101 communicates with the hydraulic oil chamber 96 in the embodiment. According to the structure, the second oil path 102 can be formed by the groove 103 even when the base end portion 53a abuts on a surface departing from the groove 103 of the intermediate wall portion 51c. The groove may be provided on the base end portion 53a side, and it is also preferable that a disc-shaped member provided with a notch or a groove is sandwiched between the intermediate wall portion 51c and the base end portion 53a to thereby form the second oil path 102. As the first oil path 101 and the second oil path 102 are formed as described above in the embodiment, the hydraulic pressure supplied through the oil path in the input shaft is supplied to the hydraulic oil chamber 96 through the first oil path 101 and the second oil path 102.

[Coupling Structure by Nut Member]

Furthermore, in the case of the present embodiment, the cylindrical portion 51a of the center piece 51 and the flange member 53 are coupled by a nut member 200 as a screwing member for forming the above second oil path 102. The coupling structure by the nut member 200 will be explained with reference to FIG. 1, FIG. 3 and FIG. 4.

Figure 3:
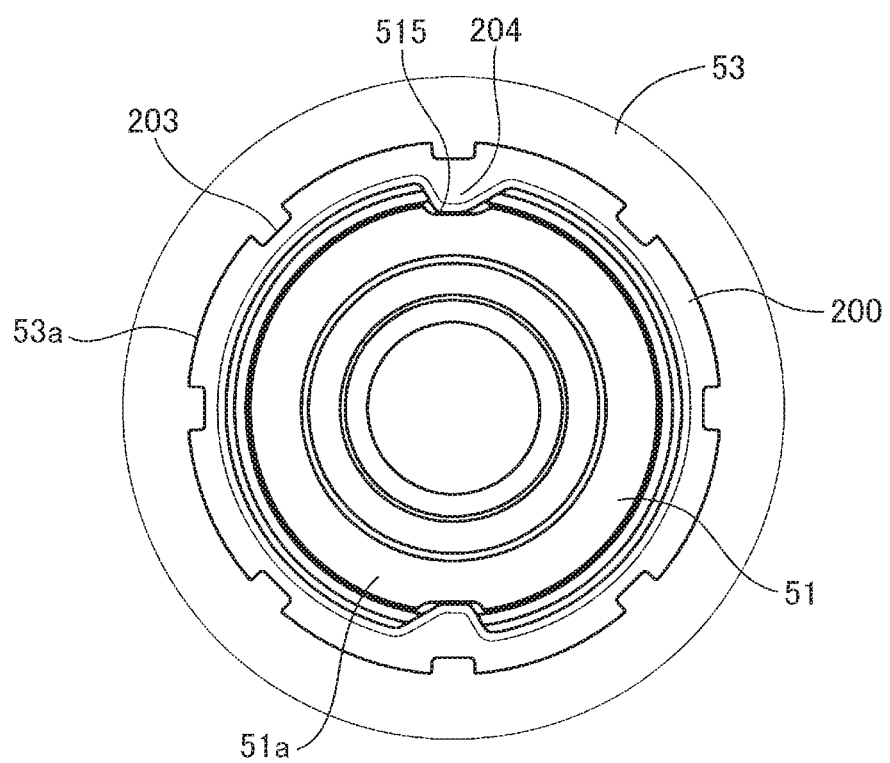
FIG. 3 is a view seen from a right direction of FIG. 1 by extracting a center piece, part of a flange member and a nut member according to the embodiment.

On an inner peripheral surface of the nut member 200, there is formed a female screw portion 201 as a second screw portion which can be screwed to the male screw portion 513 formed on the outer peripheral surface of the cylindrical portion 51a of the center piece 51. One end surface of the nut member 200 in the axial direction is an abutting surface 202 which is formed to be parallel to the abutted surface 532 of the base end portion 53a of the flange member 53 as well as formed smoothly over the entire circumference. In the embodiment, the abutted surface 532 and the abutting surface 202 are formed to be parallel in the radial direction. Furthermore, plural grooves 203 are formed on the outer peripheral surface of the nut member 200 as shown in FIG. 1 and FIG. 3.

In the nut member 200 formed in the above manner, the nut member 200 is rotated by engaging a tool with plural grooves 203, thereby screwing the female screw portion 201 to the male screw portion 513 of the center piece 51 and allowing the abutting surface 202 to abut on the abutted surface 532 of the base end portion 53a of the flange member 53. Then, the nut member 200 is further screwed until the base end portion 53a of the flange member 53 abuts on the intermediate wall portion 51c of the center piece 51, thereby pressing the flange member 53 onto the intermediate wall portion 51c of the center piece 51. That is, an axial force is generated in the nut member 200 by screwing between the male screw portion 513 and the female screw portion 201, thereby allowing the base end portion 53a of the flange member 53 to strongly abut onto the intermediate wall portion 51c. Accordingly, friction force between the base end portion 53a and the intermediate wall portion 51c is increased and the flange member 53 and the center piece 51 are coupled. In the structure of rotating the nut member 200 by the tool, the outer peripheral surface may be formed in polygons such as a hexagon in addition to the above plural grooves 203.

As described above, rotation of the nut member 200 is stopped with respect to the cylindrical portion 51a in a state where the nut member 200 is screwed to the cylindrical portion 51a of the center piece 51. In the embodiment, a caulking portion 204 is formed by caulking part of the nut portion 200 in the circumferential direction at the other end portion in the axial direction as a rotation stopper portion. Then, as shown in FIG. 1 and FIG. 3, the caulking portion 204 is engaged with an engaging groove 515 formed on the other end surface of the cylindrical portion 51a of the center piece 51 in the axial direction, thereby stopping rotation of the nut member 200 with respect to the cylindrical portion 51a. The axial force is generated in the nut member 200 by screwing between the male screw portion 513 and the female screw portion 201 as described above and the nut member 200 may be loosened if the rotation is not stopped, therefore, the rotation is stopped as described above in the embodiment.

Figure 4A:
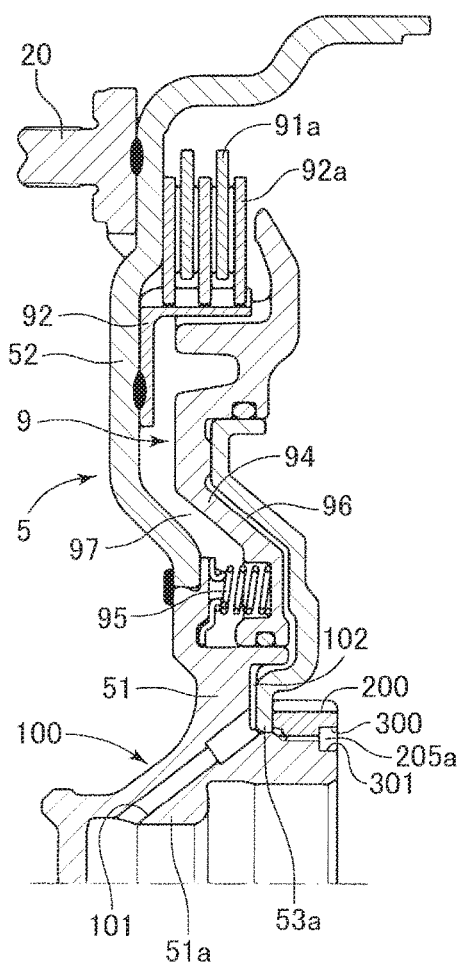
FIGS. 4A and 4B are partial cross-sectional views of a clutch device showing another two examples of rotation stopping of the nut member.
Figure 4B:
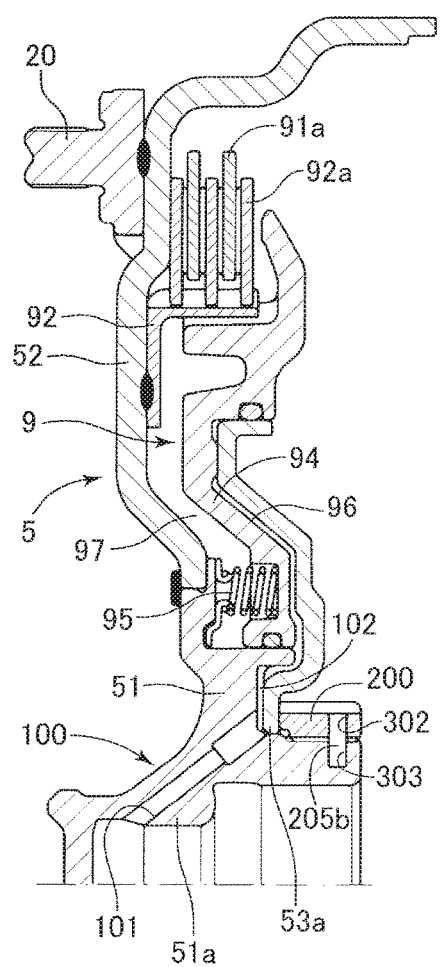

The rotation stop of the nut member 200 may be performed by other structures other than the structure using the caulking portion 204. For example, as shown in FIG. 4, the rotation stop may be performed by bridging pins 205a, 205b over the nut member 200 and the cylindrical portion 51a of the center piece 51. That is, as shown in FIG. 4(a), engaging grooves 300, 301 are formed respectively in the other end surface of the nut member 200 in the axial direction and the other end surface of the cylindrical portion 51a in the axial direction so as to face each other. Then, the pin 205a is inserted between these engaging grooves 300 and 301, thereby engaging the pin 205a with the engaging grooves 300, 301 respectively to realize the rotation stop of the nut member 200.

Also as shown in FIG. 4 (b), a through hole 302 piercing in the radial direction is formed in the nut member 200 and a recessed portion 303 recessed in the radial direction is formed on the outer peripheral surface of the cylindrical portion 51a respectively. Then, the pin 205b is inserted from the through hole 302 to the recessed portion 303, thereby engaging the pin 205b with the through hole 302 and the recessed portion 303 respectively and realizing the rotation stop of the nut member 200. It is preferable that the insertion of the pins 205a and 205b into the engaging grooves 300, 301 or to the through hole 302 and the recessed portion 303 is performed by press fitting, or that part of the pin is caulked after insertion to thereby prevent the pin from falling off. The rotation stop may be performed by other structures in addition to the rotation stop by using the pins, for example, by welding part of the nut member and the cylindrical portion.

In the case of the above embodiment having the above structure, the rotation of the engine 4 is transmitted to the automatic transmission mechanism 2 through the torque converter 3. At this time, when the lockup clutch 9 is not engaged, the rotation is transmitted from the pump impeller 6 to the turbine runner 7 and the input shaft of the automatic transmission mechanism 2 rotates by the hydraulic oil circulating between the pump impeller 6 and the turbine runner 7. On the other hand, when the lockup clutch 9 is engaged (lockup state), the rotation inputted from the engine 4 to the front cover 5 is transmitted to the input shaft of the automatic transmission mechanism 2 through the damper device 10.

That is, when the hydraulic pressure is supplied to the hydraulic oil chamber 96 from the oil path formed in the input shaft through the first oil path 101 and the second oil path 102, the piston 94 presses the inner friction plates 92a to thereby engage the inner friction plates 92a with the outer friction plates 91a. Then, the rotation is transmitted between the clutch hub 92 fixed to the front cover 5 and the clutch drum 91. The clutch drum 91 is connected to the input member 11 of the damper device 10 and the output member 12 of the damper device 10 is connected to the input shaft of the automatic transmission mechanism 2 through the turbine hub 72, therefore, the rotation of the clutch drum 91 is transmitted to the input shaft through the damper device 10. Accordingly, vibration of the engine 4 is transmitted to the input shaft while being absorbed by the damper device 10 even when the lockup clutch 9 is engaged.

Although the second oil path 102 communicates with the hydraulic oil chamber 96 so that the lockup clutch 9 is engaged, the second oil path 102 is formed between the center piece 51 and the flange member 53 by coupling them with each other as described above. In the case of the embodiment, the center piece 51 and the flange member 53 can be coupled without causing backlash by adopting the simple structure in which coupling between the center piece 51 and the flange member 53 is performed by screwing the nut member 200 to the cylindrical portion 51a of the center piece 51.

That is, as the nut member 200 is screwed to the male screw portion 513 of the cylindrical portion 51a and the flange member 53 is pressed onto the intermediate wall portion 51c of the center piece 51, first, the flange member 53 can be fixed to the center piece 51 in the axial direction. The positioning of the flange member 53 by the snap ring is not performed at this time, therefore, the occurrence of backlash in the axial direction can be suppressed. Furthermore, the base end portion 53a of the flange member 53 is allowed to abut on the intermediate wall portion 51c strongly by the axial force of the nut member 200 to thereby increase the friction force between the base end portion 53a and the intermediate wall portion 51c, therefore, relative positions of the flange member 53 and the center piece 51 in the circumferential direction can be regulated due to the friction force and relative rotation can be suppressed. As the regulation of positions in the circumferential direction is not performed by engagement of claws in the case of embodiment, the occurrence of backlash in the circumferential direction can be also suppressed.

Also in the case of the embodiment, the hydraulic oil chamber 96 can be sealed by a screwing portion formed by the male screw portion 513 of the cylindrical portion 51a and the female screw portion 201 of the nut member 200. That is, the screwing portion has slight gaps between respective peaks and valleys of the male screw portion 513 and the female screw portion 201, however, the gaps are formed along a helical direction of the screws, therefore, a length from an end of the screwing portion on the hydraulic oil chamber 96 side to the outside on the opposite end's side is increased. As a result, leakage of oil through these gaps can be suppressed. Accordingly, the second oil path 102 can be sealed without providing a sealing member between the base end portion 53a and the cylindrical portion 51a in the case of the embodiment, which can reduce the number of components. For example, in the case of the structure described in Patent Document 1, the O-ring (sealing member) is provided between the flange member and cylindrical portion of the center piece to thereby seal the above oil path, the number of components is increased. In contrast to this, the oil path is sealed by the screwing portion as described above in the embodiment, therefore, it is not necessary to provide such sealing member and the number of components can be reduced.

As the second oil path 102 is sealed with the screwing portion as described above, it is preferable to increase the number of turns of threads in the screwing portion so as to be sufficiently long. It is also preferable to set the number of turns suitably in consideration of the number of turns necessary on design for coupling the flange member 53 to the center piece 51 by the nut member 200. For example, when the minimum number of turns which is necessary on design is secured, the sealing effect by the screwing portion can be obtained. However, when the number of turns of threads in the screwing portion is increased more than necessary, dimensions of the nut member 200 and the cylindrical portion 51a in the axial direction is increased. Accordingly, for example, the number of turns in the screwing portion is preferably three turns (three winding) or more to 10 turns or less, though depending on the material, the shape and size of the screws in the nut member 200 and the cylindrical portion 51a and so on.

As the intermediate wall portion 51c as the wall portion and the cylindrical portion 51a are integrally formed in the center piece 51, the flange member 53 and the center piece 51 can be coupled with a simple structure. For example, it is possible to adopt a structure in which the intermediate wall portion 51c and the cylindrical portion 51a of the center piece 51 are separately formed and the intermediate wall portion 51c is supported by the cylindrical portion 51a. However, another structure for coupling the intermediate wall portion 51c to the cylindrical portion 51a will be necessary in this case. The embodiment does not require such another structure, the simple structure can be realized.

In the case where the structure in which the intermediate wall portion 51c and the cylindrical portion 51a are separately formed and the intermediate wall portion 51c is supported by the cylindrical portion 51a is adopted, for example, a flange portion protruding in the radial direction is provided on one end of the cylindrical portion 51a in the axial direction, the side surface of the intermediate wall portion 51c is allowed to abut on the flange portion while fitting the intermediate wall portion 51c to the cylindrical portion 51a to support the intermediate wall portion 51c, the flange member 53 is fitted from the other end side of the cylindrical portion 51a in the axial direction in this state and further screwed and fastened by the nut member 200, thereby coupling the intermediate wall portion 51c to the flange member 53 by being sandwiched between the nut member 200 and the flange portion.

Also in the embodiment, the fitting surface 531 of the flange member 53 is coupled to the cylindrical surface 512 of the cylindrical portion 51a over the entire circumference. Accordingly, the cylindrical surface 512 can abut on the fitting surface 531 over the almost entire circumference, and the gap between the flange member 53 and the cylindrical portion 51a can be small. Therefore, the leakage of oil from the second oil path 102 can be reduced.

The clutch device (lockup clutch 9) according to the present disclosure seals the oil path (second oil path 102) with the screwing portion between the first screwing portion (male screwing portion 513) and the second screwing portion (female screwing portion 201). Accordingly, the oil path (second oil path 102) can be sealed without using the sealing member.

Also in the clutch device (lockup clutch 9) according to the present disclosure, the oil chamber is the hydraulic oil chamber (96) to which an engagement pressure for engaging friction plates (outer friction plates 91a and inner friction plates 92a) is supplied. In the embodiment, the second oil path 102 formed as described above communicates with the hydraulic oil chamber 96.

Accordingly, the high pressure acts also on the oil path (second oil path 102), however, the second member (flange member 53) and the first member (center piece 51) are coupled by the screwing member (nut member 200) to thereby form the oil path (second oil path 102) as described above. Therefore, even when the high pressure acts on the oil path (second oil path 102), the coupling between the second member (flange member 53) and the first member (center piece 51) can be sufficiently maintained by the axial force of the screwing member (nut member 200) as well as the leakage of oil from the oil path (second oil path 102) can be suppressed.

Also in the clutch device (lockup clutch 9) according to the present disclosure, the screwing member (nut member 200) has the abutting surface (202) abutting on the abutted surface (532) of the second member (flange member 53) over the entire circumference and pressing the second member (flange member 53) toward the wall portion (intermediate wall portion 51c), thereby sealing the oil path (second oil path 102) by the abutting surface (202) and the abutted surface (532).

As the oil path (second oil path 102) is sealed by allowing the abutting surface (202) of the screwing member (nut member 200) abut onto the abutted surface (532) of the second member (flange member 53) over the entire circumference, it is not necessary to provide a sealing member also between the screwing member (nut member 200) and the second member (flange member 53), which can reduce the number of components.

The clutch device (lockup clutch 9) according to the present disclosure also has rotation stopping portions (204, 205a, 205b) for stopping rotation of the screwing member (nut member 200) with respect to the cylindrical portion (51a) in the state where the screwing member (nut member 200) is screwed to the first screw portion (male screw portion 513). Accordingly, it is possible to prevent the screwing member (nut member 200) from being loosened easily.

Also in the clutch device (lockup clutch 9) according to the present disclosure, the rotation stopping portion corresponds to the caulking portion (204) which caulks part of one of the screwing member (nut member 200) and the cylindrical portion (51a) to engage the part with part of the other. Accordingly, the rotation stop of the screwing member (nut member 200) can be realized with a simple structure. Although the caulking portion 204 is provided in the nut member 200 in the embodiment, it is also preferable that part of the cylindrical portion 51a is caulked to be the caulking portion and engaged with an engaging groove provided in the nut member 200.

Also in the clutch device (lockup clutch 9) according to the present disclosure, the rotation stopping portion corresponds to the pins (205a, 205b) being bridged over the screwing member (nut member 200) and the cylindrical portion (51a) and engaged with respective members. Also according to the structure, the rotation stop of the screwing member (nut member 200) can be realized with a simple structure.

Furthermore, in the clutch device (lockup clutch 9) according to the present disclosure, the friction plates (outer friction plates 91a and inner friction plates 92a) can connect between to the engine (4) and the automatic transmission mechanism (2) freely.

Accordingly, vibration of the engine (4) is transmitted also between the first member (center piece 51) and the second member (flange member 53) through the friction plates (outer friction plates 91a and inner friction plates 92a) in the state where the clutch device (lockup clutch 9) is engaged, however, it is possible to suppress the generation of abnormal noise or abrasion due to the vibration because the first member (center piece 51) and the second member (flange member 53) are coupled by the screwing member (nut member 200) without causing backlash.

That is, when the first member (center piece 51) and the second member (flange member 53) are coupled by claws or the snap ring, backlash may occur in the circumferential direction and the axial direction and abnormal noise may occur. The first member (center piece 51) and the second member (flange member 53) are coupled by the screwing member (nut member 200) without using the claws and the snap ring, thereby suppressing the occurrence of backlash and suppressing the generation of abnormal noise or abrasion due to the vibration of the engine (4).

Although the structure according to the present disclosure is applied to the lockup clutch 9 of the torque converter 3 as the clutch device in the embodiment, the structure according to the present disclosure can be also applied to, for example, other than the lock up clutch, a starting clutch connecting between the engine and the automatic transmission mechanism in a hybrid drive device.

Also in the embodiment, the structure in which the male screw portion 513 is formed on the outer peripheral surface of the cylindrical portion 51*a* as the first screw portion and the female screw portion 201 is formed on the inner peripheral surface of the nut member 200 as the screwing member respectively and the nut member 200 is screwed to the outer peripheral surface of the cylindrical portion 51*a* has been explained. However, it is also preferable that the female screw portion is formed on the inner peripheral surface of the cylindrical portion as the first screw portion and the male screw portion is formed on the outer peripheral surface of the screwing member as the second screw portion and the screwing member is screwed to the inner peripheral surface of the cylindrical portion depending on the structure of the clutch device.

In the embodiment, the second oil path 102 formed by the center piece 51 as the first member and the flange member 53 as the second member communicates with the hydraulic oil chamber 96. However, the oil path formed by the first member and the second member may communicate with the cancel oil chamber 97.

INDUSTRIAL APPLICABILITY

The clutch device can be mounted on vehicles such as a passenger car, a truck and so on.

REFERENCE SIGNS LIST

1 automatic transmission
2 automatic transmission mechanism
3 torque converter
4 engine
5 front cover
9 lockup clutch (clutch device)
51 center piece (first member)
51*a* cylindrical portion
51*c* intermediate wall portion (wall portion)
512 cylindrical surface
513 male screw portion (first screw portion)
53 flange member (second member)
531 fitting surface
532 abutted surface
91*a* outer friction plate (friction plate)
92*a* inner friction plates (friction plate)
94 piston
96 hydraulic oil chamber (oil chamber)
102 second oil path (oil path)
200 nut member (screwing member)
201 female screw portion (second screw portion)
202 abutting surface
204 caulking portion (rotation stopping portion)
205*a*, 205*b* pin (rotation stopping portion)

The invention claimed is:

1. A clutch device comprising:
a piston pressing friction plates;
a first member having a wall portion and a cylindrical portion extending from the wall portion in an axial direction, in which a first screw portion is formed on a radially outward facing cylindrical surface of the cylindrical portion;
a second member fitted to the cylindrical portion and forming an oil path communicating with an oil chamber allowing a hydraulic pressure to act on the piston between the wall portion and the second member; and
a screwing member having a second screw portion which can be screwed to the first screw portion freely, which is screwed to the first screw portion to generate an axial force to thereby press the second member toward the wall portion and to abut the second member against the wall portion to thereby couple the first member to the second member.

2. The clutch device according to claim 1,
wherein the oil path is sealed with a screwing portion formed by the first screw portion and the second screw portion.

3. The clutch device according to claim 1,
wherein the oil chamber is a hydraulic oil chamber to which an engaging pressure for engaging the friction plates is supplied.

4. The clutch device according to claim 1,
wherein the screwing member has an abutting surface abutting on an abutted portion of the second member over the entire circumference and pressing the second member onto the wall portion, and
the oil path is sealed with the abutting surface and the abutted surface.

5. The clutch device according to claim 1, further comprising:
a rotation stopping portion which stops rotation of the screwing member with respect to the cylindrical portion in a state where the screwing member is screwed to the first screw portion.

6. The clutch device according to claim 5,
wherein the rotation stopping portion corresponds to a caulking portion which caulks part of one of the screwing member and the cylindrical portion to engage the part with part of the other.

7. The clutch device according to claim 5,
wherein the rotation stopping portion corresponds to pins bridged over the screwing member and the cylindrical portion and engaged with respective members.

8. The clutch device according to claim 1,
wherein the friction plates can connect an engine and an automatic transmission mechanism freely.

9. The clutch device according to claim 2,
wherein the oil chamber is a hydraulic oil chamber to which an engaging pressure for engaging the friction plates is supplied.

10. The clutch device according to claim 2,
wherein the screwing member has an abutting surface abutting on an abutted portion of the second member over the entire circumference and pressing the second member onto the wall portion, and
the oil path is sealed with the abutting surface and the abutted surface.

11. The clutch device according to claim 2, further comprising:

a rotation stopping portion which stops rotation of the screwing member with respect to the cylindrical portion in a state where the screwing member is screwed to the first screw portion.

12. The clutch device according to claim 11,
wherein the rotation stopping portion corresponds to a caulking portion which caulks part of one of the screwing member and the cylindrical portion to engage the part with part of the other.

13. The clutch device according to claim 11,
wherein the rotation stopping portion corresponds to pins bridged over the screwing member and the cylindrical portion and engaged with respective members.

14. The clutch device according to claim 2,
wherein the friction plates can connect an engine and an automatic transmission mechanism freely.

15. The clutch device according to claim 9,
wherein the screwing member has an abutting surface abutting on an abutted portion of the second member over the entire circumference and pressing the second member onto the wall portion, and
the oil path is sealed with the abutting surface and the abutted surface.

16. The clutch device according to claim 15, further comprising:
a rotation stopping portion which stops rotation of the screwing member with respect to the cylindrical portion in a state where the screwing member is screwed to the first screw portion.

17. The clutch device according to claim 16,
wherein the rotation stopping portion corresponds to a caulking portion which caulks part of one of the screwing member and the cylindrical portion to engage the part with part of the other.

18. The clutch device according to claim 16,
wherein the rotation stopping portion corresponds to pins bridged over the screwing member and the cylindrical portion and engaged with respective members.

19. The clutch device according to claim 17,
wherein the friction plates can connect an engine and an automatic transmission mechanism freely.

20. The clutch device according to claim 18,
wherein the friction plates can connect an engine and an automatic transmission mechanism freely.

21. The clutch device according to claim 1, wherein a surface of the second member adjacent the wall portion of the first member includes a groove configured to form a space when the second member abuts the first member, the oil path comprises a first oil path portion formed in the first member and the space formed by the groove is a second oil path portion that connects the first oil path portion to the oil chamber.

* * * * *